June 4, 1935.   O. A. STUDLEY ET AL   2,003,561
EGG GRADING MACHINE
Filed May 6, 1932   3 Sheets-Sheet 1

OSCAR A. STUDLEY
KENNON R. GILBERT
INVENTORS
BY
ATTORNEY

June 4, 1935.　　O. A. STUDLEY ET AL　　2,003,561
EGG GRADING MACHINE
Filed May 6, 1932　　3 Sheets-Sheet 2

OSCAR A. STUDLEY
KENNON R. GILBERT
INVENTORS
BY
ATTORNEY

June 4, 1935.　　　O. A. STUDLEY ET AL　　　2,003,561
EGG GRADING MACHINE
Filed May 6, 1932　　　3 Sheets-Sheet 3

OSCAR A. STUDLEY
KENNON R. GILBERT
INVENTORS

BY Lincoln Johnson
ATTORNEY

Patented June 4, 1935

2,003,561

UNITED STATES PATENT OFFICE 2,003,561

EGG GRADING MACHINE

Oscar A. Studley and Kennon R. Gilbert,
Sonoma, Calif.

Application May 6, 1932, Serial No. 609,686

9 Claims. (Cl. 209—121)

This invention relates to improvements in egg grading machines altho it is to be understood the invention is not to be limited exclusively thereto, as the apparatus may be used for grading other objects, such as fruits, vegetables and nuts.

In the marketing of eggs it is customary to separate them into grades according to weight, those eggs averaging a higher per dozen weight commanding a higher sale price per dozen. Since there are several commercial grades of eggs, based upon the per dozen weight, and because of the slight variation in the weight per dozen of these grades, and the relatively smaller variation in weight between the individual eggs of the several grades, it is apparent, that the method of grading now practiced and referred to as "grading eggs by hand" is a very slow and tedious process, and as will be explained hereafter a very inaccurate method of determining the grade.

In this latter method a number of scales are used, each fixed to indicate the correct weight of an egg for a given grade, the number of scales depending upon the number of grades desired, and the egg is placed successively upon these various scales until it reaches the scale upon which it balances. Even with skillful operators, who are able to reduce the number of scales upon which the egg must be placed before determination, this process consumes much time. The greater disadvantage of this latter method is its inaccuracy, due to the fact that the weighing done with the lever type scales requires that the egg shall balance the weight. Placing the egg upon the scale imparts such a teetering motion, which must cease before the weight can be determined accurately, and a considerable period of time is consumed in awaiting the cessation of this teetering motion. Furthermore in the use of this type of scale, an egg, which is a fraction of an ounce on either side of the dividing line between any given weight grades, may nevertheless reach an apparent balance, and although such eggs, approximating a balance, should fall into one or the other of the two grades in question, the determination of the grade is in this fashion left to the discretion of the operator.

The need for a more rapid and accurate grading process is therefore apparent.

With our device the eggs are all placed on carrier arms and thereafter the weighing is automatic and since the principle employed in the construction and operation of the machine is such as to eliminate, through positive action, all teetering, the weighing process is rapid, and accurate.

The principal object, therefore, is to produce a machine whereby eggs may be rapidly and accurately graded into the various weights which in the trade is required of the producer.

A further object is to produce a machine wherein the grading is automatic and the disposition of the eggs into their various bins will be determined mechanically.

A further object is to produce a machine which will be simple in construction and therefore economical to manufacture.

A still further object is to produce a machine wherein the eggs will not be injured during the grading operation.

Other objects and advantages will be apparent during the course of the following description.

In the accompanying drawings forming a part of this specification, and in which like numerals designate like parts Figure 1 is a top plan view of our device.

Figure 1:
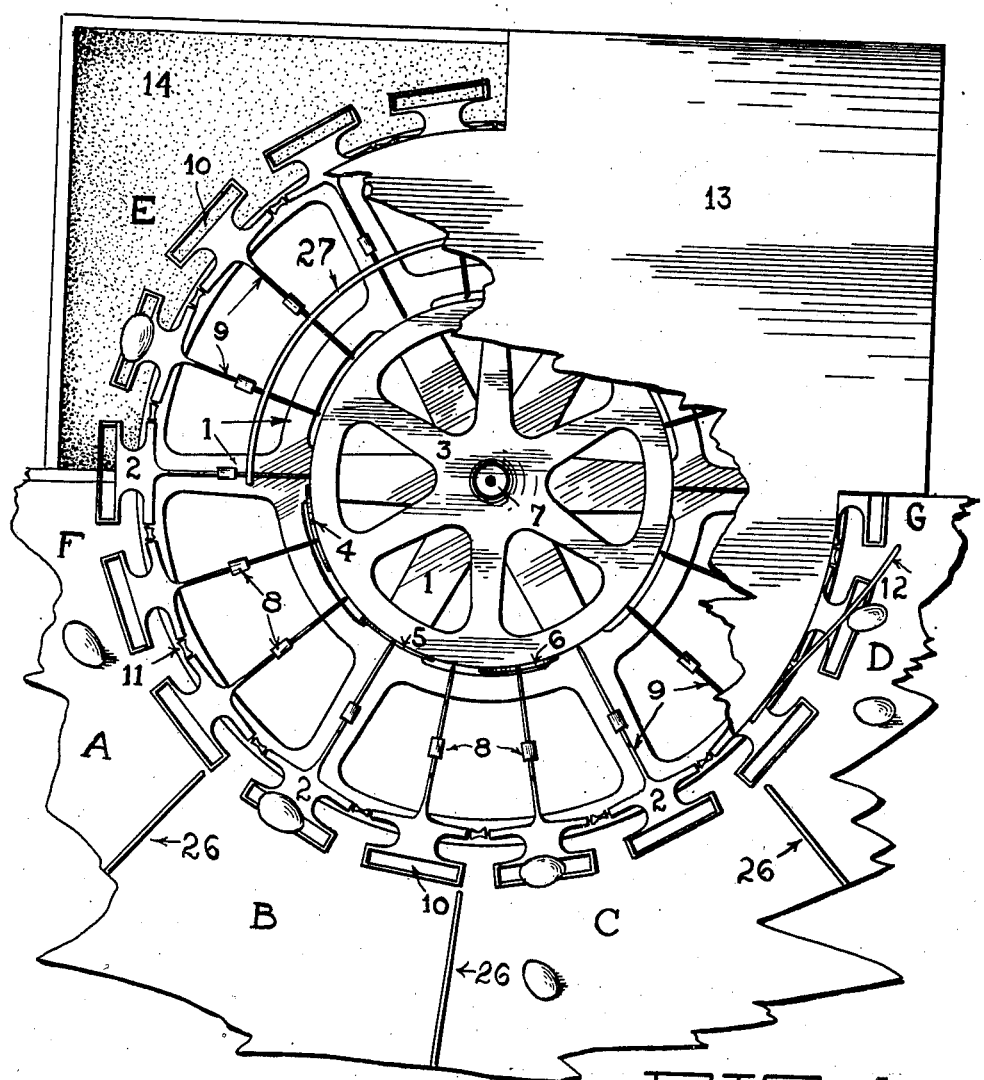
Figure 2:
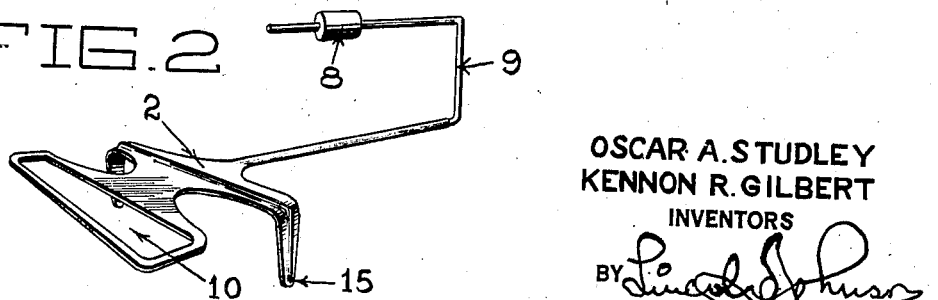
Figure 2 is a perspective view of one of the egg carrying arms.
Figure 3:
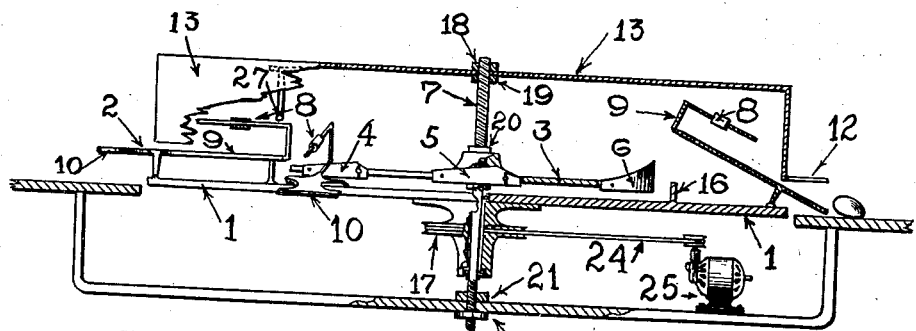
Figure 3 is a vertical cross-section of our device.
Figure 4:
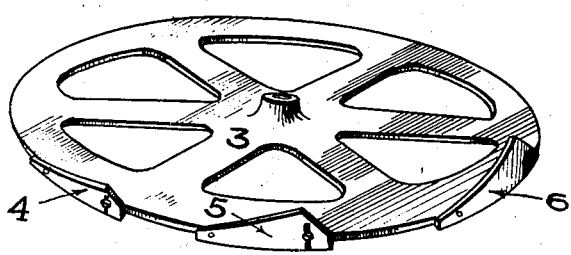
Figure 4 is a perspective view of the stationary gauge plate and the cams.
Figure 5:
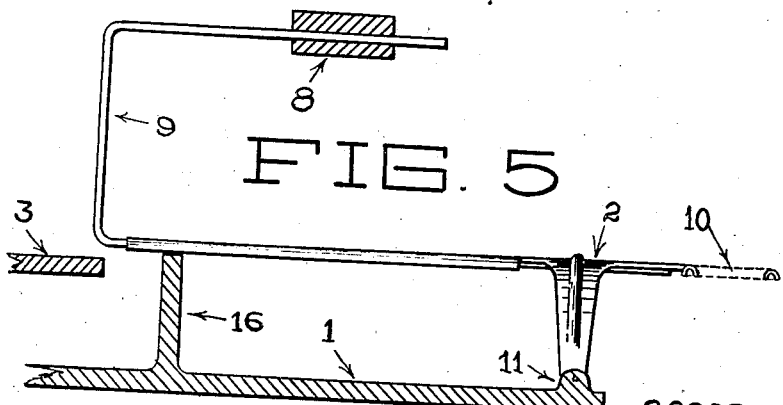
Figure 5 is an enlarged detail view of one of the carrier arms.
Figure 6:
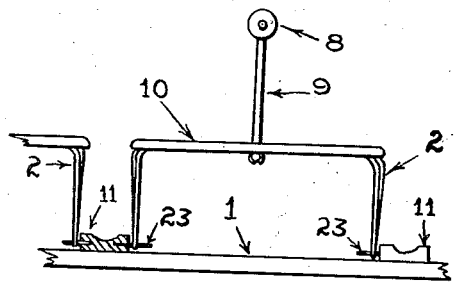
Figure 6 is front elevation of one of the carrier arms.
Figure 7:
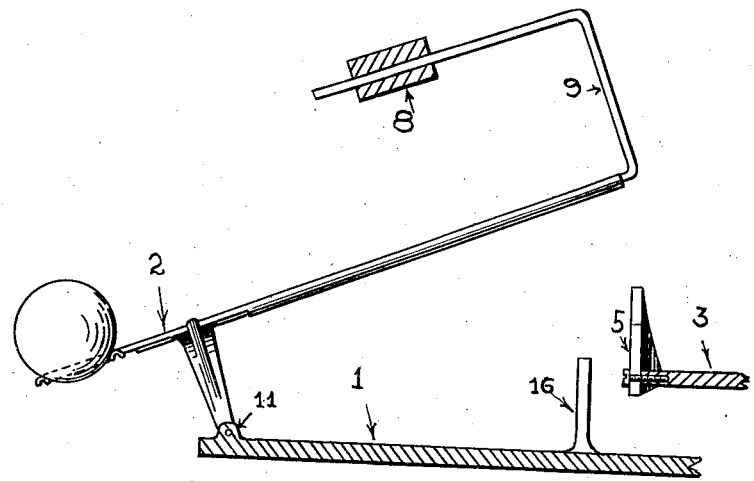
Figure 7 is a cross section view of one of the carrier arms with the egg in position and coacting with one of the cams.

In the accompanying drawings, wherein for the purpose of illustration, a preferred embodiment of our machine is shown, the numeral seven, designates a shaft, firmly fixed against rotation by nuts 21 and 22, and around which shaft a carrier disc 1 rotates. This carrier 1, has spaced around its periphery a series of egg-carrying arms 2, which, being identical only one will be described. The egg carrying arm 2, has at its outer end an opening, 10, designed to hold an egg in the most satisfactory manner to facilitate the weighing. It will be borne in mind that one end of an egg is larger than the other, thus, although the weight of an egg is evenly distributed in relation to its longest axis this is not true in relation to its shorter axis. It will be thus seen that in weighing an egg by means of a balance that it is essential to have the longest axis of the egg parallel to the fulcrum in order to more evenly distribute the weight. For this purpose we have designed the opening 10 so that the egg will rest in this desired position while being weighed. At the other end of the carrier 2, is a member 9, so constructed as to co-act with cams and effect the weighing, and also support a poise 8 whose purpose is to balance the carrier arm, and to return the carrier arm to its horizontal position after depositing the egg. The supporting members of the carrier arms are downwardly extending and formed so as to support the egg and all related counterweights at such distance above the fulcrum that a slight tilt imparted to the carrier arm will shift the balancing point and thus increase the force exerted in the direction of the tilt. This eliminates the teetering found in other existing methods, before mentioned, and speeds up the weighing. This tilt mentioned is effected by cams 4, 5, and 6, which are graduated at increasing heights and supported in fixed relation to the carrier arms 2 by a stationary gauge plate 3, fastened against rotation on stationary shaft 7. Suitable supports 16, are placed on the carrier 1 to support the egg carriers in relation to the gauge plate 3 and its dependent cams 4, 5, and 6. In order to rotate the carrier we provide a source of power and herein described as pulley 17, and belt 24 and motor 25. Bins A, B, C, and D are provided and the segregation of sizes is accomplished by divider bars 26.

Figure 8:
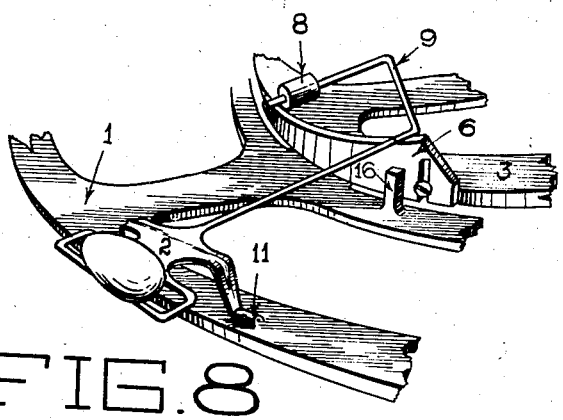
Figure 8 is a perspective view of one of the cams and a sectional drawing showing the relation of parts and action of this machine.

The operation of our device is as follows:

Assuming the machine to be in operation, the carrier 1 will be rotating in a counter-clockwise direction and an egg will be placed on a carrier arm 2 at point E or its proximity. The carrier arm will be held in its horizontal position by retainer bar 27 until the rotation of the carrier 1 has brought the carrier arm into engagement with the first cam 4. All carrier arms have been previously balanced whereby the force exerted by the poise 8 is greater than the force exerted by the minimum sized egg of the first desired grade when the carrier arm is in a horizontal position and resting on support 16. As the rotation of the carrier 1 brings the carrier arm 2 and its supported egg into position F the extremity of element 9 will be brought into engagement with cam 4 and the carrier arm 2 will be tilted as shown in Figure 8 resulting in a shifting of the forces exerted and by pre-determining this tilt a weighing will be effected. At this point, when the carrier arm has been tilted to the maximum height of cam 4 if the egg has been imparted a leverage sufficient to over-balance the counter poise 8, the carrier 2 will continue to tilt, depositing the egg in bin A, and immediately return to its original position. If the egg is not of sufficient weight to overbalance the counter poise 8 the element 9 will remain in engagement with cam 4 and be so returned to its original position and be carried by the rotation of the carrier 1 into engagement with cam 5, which at its maximum height will impart a greater tilt than that of cam 4, and the resulting leverage imparted to the egg will be greater than the leverage at any point on cam 4, thus resulting in a second weighing. This operation will be repeated at cam 6 and at as many more points as desired for making additional grades. A raker 12 is fastened to the cover 13 so that it will engage any small egg remaining on the carrier arm and eject it from the carrier arm before it recedes under the cover 13 at point G.

It will be thus seen that the opeation of this machine is automatic and that as the eggs are placed on the carrier arms and travel with the carrier 1 they will be weighed and segregated into the desired grades with a minimum amount of labor.

It is to be understood that the form of our invention herewith shown and described is to be taken as a preferred example of the machine and that various changes relative to the size, shape, and arrangement of parts may be resorted to without departing from the spirit of the invention or the scope of the subjoined claims.

We claim:

1. In a centrally pivoted egg grading machine the combination of an egg carrying element balanced to rest in a horizontal plane with an egg thereon whereby tilting of said element will result in a shifting of the leverage and its resultant forces and the discharge of the egg, said element having a frame to support an egg with its longest axis parallel to the pivotal axis of the element, and means for tilting said element from its balanced horizontal position into a plurality of selected angular positions whereby the egg will overbalance the element at a selected angular position corresponding to the weight of the egg.

2. In an egg grading machine a pivoted egg carrying arm having an elongated opening, the longitudinal edges of which are parallel to the pivotal axes of the arm, downwardly extending supports on which said egg carrying arm is fulcrumed, a member arranged in opposition to the egg receptacle in its relation to the fulcrum, and supporting thereon a counterpoise, to balance said arm on a horizontal plane means for tilting the egg carrying arm at times, and means for maintaining said arm in a horizontal position at other times.

3. An egg grading machine comprising a rotating table; a plurality of radially disposed levers fulcrumed on said table, there being an egg receiver on one end of each lever and a counterpoise mounted on the other end of each lever to balance the lever when an egg of a selected maximum weight is supported on the receiver; and a series of cams of progressively increasing height related to an end of each lever to tilt the lever into different angular positions whereby in one of said positions the weight of the egg will overbalance the counterpoise and discharge the egg.

4. An egg grading machine comprising a rotating table; a plurality of radially disposed levers fulcrumed around the circumference of said table, each lever having an egg receiver at one end and a counter-poise at the other end to balance the lever when an egg of a selected maximum weight is supported thereon; a station at which eggs are filled on the receivers; stations adjacent said filling station into which eggs of graded weights above and below the maximum are automatically discharged; means opposite each station to tilt the levers into an egg weighing position, the angle of tilt increasing progressively according to the distance from the filling station, whereby eggs of the maximum weight and over will overbalance the counter-poise from the tilted weighing position and automatically discharge themselves at the first station, and eggs of graded decreasing weights below the maximum will overbalance the counter-poises from the tilted weighing positions and automatically discharge themselves at predetermined following stations.

5. An egg grading machine comprising a rotating table; a plurality of radially disposed levers fulcrumed around the circumference of said table, each lever having an egg receiver at one end and a counter-poise at the other end to balance the lever when an egg of a selected maximum weight is supported thereon; a station at which eggs are filled on the receivers; stations adjacent said filling station into which eggs of graded weights above and below the maximum are automatically discharged; means opposite each station to tilt the levers into an egg weighing position, the angle of tilt increasing progressively according to the distance from the filling station, whereby eggs of the maximum weight and over will overbalance the counter-poise from the tilted weighing position and automatically discharge themselves at the first station and eggs of graded decreasing weights below the maximum will overbalance the counter-poises from the tilted weighing position and automatically discharge themselves at predetermined following stations; and means to eject eggs of the minimum weight from the receivers at the final station.

6. In an egg grading machine, an egg carrying element adapted to assume a horizontal position of balance when an egg of selected maximum weight is supported thereon; independent means to forcibly tilt the element with an egg thereon into a plurality of successively different angular positions to effect the weighing of the egg, the angle of tilt being in direct ratio to the weight of the egg, whereby an egg of maximum weight will overbalance the carrying element from a tilted position of a lesser angle than eggs of less than maximum weight.

7. In an egg grading machine, an egg carrying element adapted to assume a horizontal position of balance when an egg of selected maximum weight is supported thereon; and a series of cams of successively increasing pitches to forcibly tilt the element into successively different angular positions to effect the overbalance of the element at a slight angular pitch with an egg weighing slightly less than the maximum, and the overbalance of the element by eggs of lesser weights at progressively increasing angular pitches.

8. In an egg grading machine, an egg carrying element adapted to assume a horizontal position of balance when an egg of selected maximum weight is supported thereon; a series of cams of successively different angular positions to effect the overbalance of the element at a slight angular pitch with an egg weighing slightly less than the maximum and the overbalance of the element by eggs of lesser weights at progressively increasing angular pitches; and means to forcibly eject eggs of minimum weight not dislodged by tilting.

9. An egg grading machine comprising a rotating table; a plurality of radially disposed levers fulcrumed around the circumference of said table, each lever having an egg receiver at one end and a counter-poise at the other end to balance the lever when an egg of a selected maximum weight is supported thereon; and means to tilt the levers into different angular positions corresponding to selected egg weights, whereby in one of said positions the egg weight will overbalance the counter-poise and discharge the egg at a selected station on the circumference of the table corresponding to the egg weight.

OSCAR A. STUDLEY.
KENNON R. GILBERT.